United States Patent

Gurumoorthy et al.

(10) Patent No.: US 6,829,725 B2
(45) Date of Patent: Dec. 7, 2004

(54) FAULT RESISTANT OPERATING SYSTEM

(75) Inventors: Nagasubramanian Gurumoorthy, Hillsboro, OR (US); Raul Yanez, Phoenix, AZ (US)

(73) Assignee: Intel Corporation, Santa Clara, CA (US)

(*) Notice: Subject to any disclaimer, the term of this patent is extended or adjusted under 35 U.S.C. 154(b) by 510 days.

(21) Appl. No.: 09/881,007

(22) Filed: Jun. 12, 2001

(65) Prior Publication Data

US 2002/0188836 A1 Dec. 12, 2002

(51) Int. Cl.[7] .................................................. G06F 11/00
(52) U.S. Cl. ......................... 714/23; 714/55; 714/36
(58) Field of Search ............................. 714/23, 6, 55, 714/56, 36; 713/1, 2; 719/319

(56) References Cited

U.S. PATENT DOCUMENTS

| | | | | |
|---|---|---|---|---|
| 6,101,617 A | * | 8/2000 | Burckhartt et al. | 714/23 |
| 6,691,225 B1 | * | 2/2004 | Suffin | 713/2 |
| 2002/0042892 A1 | * | 4/2002 | Gold | 714/6 |
| 2002/0053044 A1 | * | 5/2002 | Gold et al. | 714/38 |
| 2002/0147944 A1 | * | 10/2002 | Clegg et al. | 714/45 |

OTHER PUBLICATIONS

Extensible Firmware Interface Specification, version 0.99, Apr. 19, 2000, chapters 1–3 and 17.

* cited by examiner

*Primary Examiner*—Scott Baderman
(74) *Attorney, Agent, or Firm*—Blakely, Sokoloff, Taylor & Zafman LLP

(57) ABSTRACT

Disclosed are a system and method of launching an operating system on a processing system. A firmware interface may be initially launched on a processing system. The firmware interface may comprise logic to attempt launching an operating system on the processing system. Upon detection that the attempt is unsuccessful, the processing system may be automatically reset.

31 Claims, 5 Drawing Sheets

```
// Each OS loader can choose their own timer duration dependent on how long they need to boot
SetWatchDogTimer(360,   //set the watchdog timer for 6min - 5 * 60 seconds
    0xffff, //OEMs can choose any number other than those between 0x0000-0xFFFF, 0);
```

```
// Set the BootNext variable to the appropriate value. It will be used in the next reboot if the current attempt fails.
// BootCurrent will have the OS loader that will be used for the current boot. This will set by the boot manager.
// So get that value in the variable "CurrentlySelectedBootLoader";
GetVariable (L"BootCurrent" ........, CurrentlySelectedBootLoader);
// We have to find out what OS loader is next to the currently selected one in the system's BootOrder.
GetVariable (L"BootOrder" ........, SystemBootOrder);
// Get the number of elements in SystemBootOrder. BootOrder is an array of UINT16s.
int LengthOfArray = sizeof (SystemBootOrder) / sizeof (UINT16);
// Now scan through the list of boot options in Boot Order. (BootOrder is an ordered list of boot options)
for (int i=0; i < LengthOfArray; i++ )
{
    if (i == LengthOfArray - 1) //Extreme condition when no other boot options are available to try.
    {
        Exit(); //Exits to the firmware shell it has exhausted all the possible OS boot options.
        // This behavior can be customized by the OEMs to alert an administrator or do other things.
    }
    // if the given element in the array is the currently selected OS loader stored in BootCurrent, then...
    if (SystemBootOrder[i] == CurrentlySelectedBootLoader)
    {
        // if the current boot attempt fails, we must boot the next OS as specified in the BootOrder
        // So, set the BootNext variable to the appropriate value i.e., the next element in the BootOrder
        // list
        SetVariable(L"BootNext" ,......sizeof(UINT16), SystemBootOrder[i+1]);
        break;
    }
}
```

FAULT RESISTANT OPERATING SYSTEM

BACKGROUND

1. Field

The subject matter disclosed herein relates to computing systems. In particular, the subject matter disclosed herein relates to computing systems which comprise operating systems.

2. Information

A processing platform typically comprises a central processing unit (CPU) which executes an operating system to control the use of resources for executing processing tasks. A processing platform typically initiates the execution of an operating system from machine-readable instructions maintained in a storage device in response to a reset event or a boot process. In response to a reset or boot event, the machine-readable instructions may be loaded to a system memory from a non-volatile storage device and then executed by the CPU from the system memory to "launch" the operating system.

For any particular processing platform, more than one operating system vendor may develop of an operating system for the processing platform. An operating system may be developed to be hosted on any one of multiple processing platforms and a processing platform may be developed to host any one of multiple operating systems. Additionally, any particular operating system vendor may provide multiple versions of the same operating system. Depending on a particular processing and particular operating system, such an operating system may fail to launch on the processing platform in response to a reset event or boot process.

BRIEF DESCRIPTION OF THE FIGURES

Non-limiting and non-exhaustive embodiments of the present invention will be described with reference to the following figures, wherein like reference numerals refer to like parts throughout the various figures unless otherwise specified.

FIGS. 4A–B show a flow diagram illustrating processes of loading an operating system to a processing system according to an embodiment of the process illustrated in FIG. 3.

DETAILED DESCRIPTION

Figure 1:
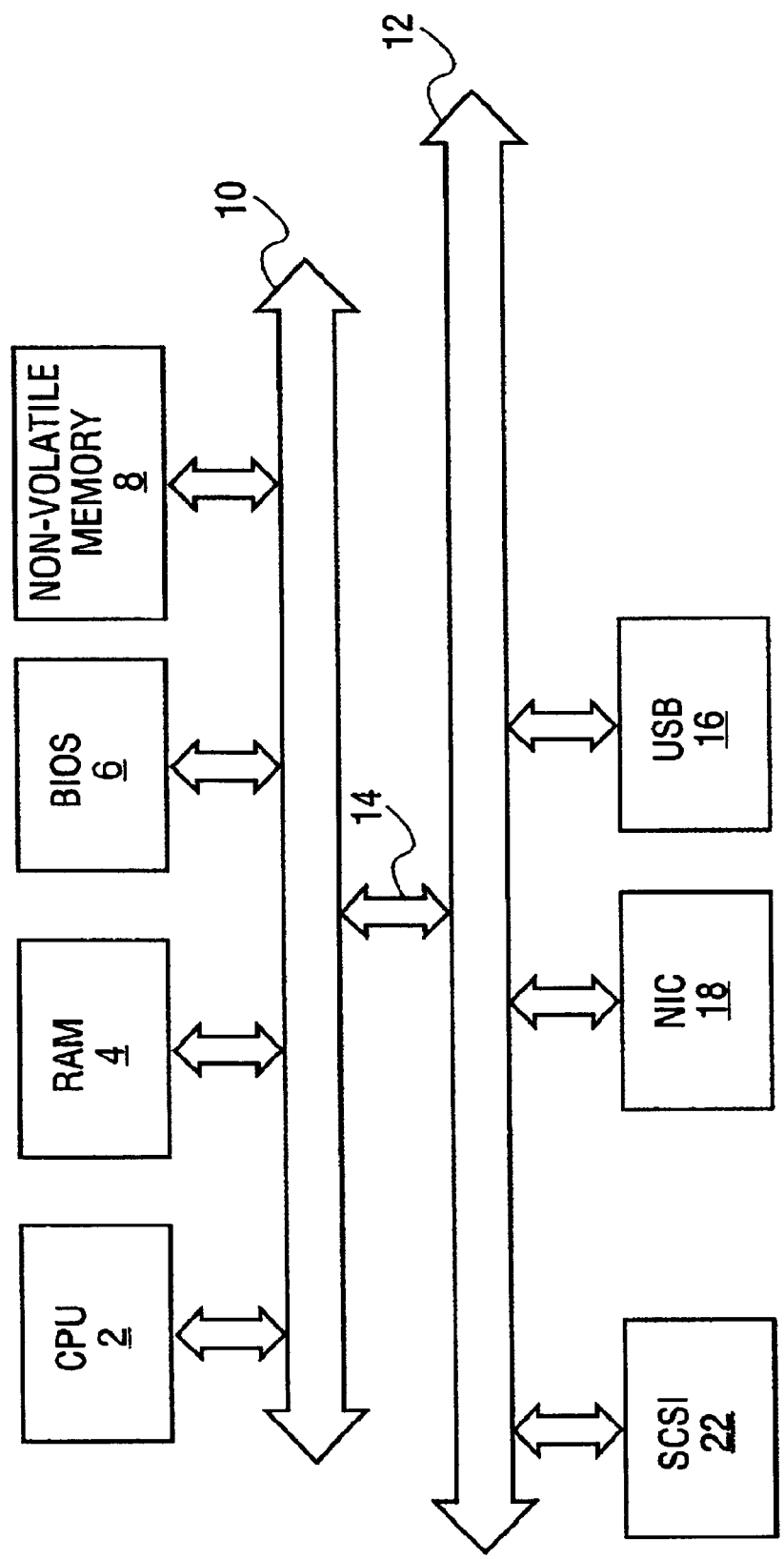
FIG. 1 is a schematic diagram illustrating a computer architecture according to an embodiment of the present invention.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

"Machine-readable" instructions as referred to herein relates to expressions which may be understood by one or more machines for performing one or more logical operations. For example, machine-readable instructions may comprise instructions which are interpretable by a processor compiler for executing one or more operations one or more data objects. However, this is merely an example of machine-readable instructions and embodiments of the present invention are not limited in this respect.

"Machine-readable medium" as referred to herein relates to media capable of maintaining expressions which are perceivable by one or more machines. For example, a machine-readable medium may comprise one or more storage devices for storing machine-readable instructions. However, this is merely an example of a machine-readable medium and embodiments of the present invention are not limited in this respect.

"Logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Also, logic may comprise processing circuitry in combination with machine-executable instructions stored in a memory. However, these are merely examples of structures which may provide logic and embodiments of the present invention are not limited in this respect.

A "processing system" as discussed herein relates to a combination of hardware and software resources for accomplishing computational tasks. However, this is merely an example of a processing system and embodiments of the present invention are not limited in this respect. A "host processing system" relates to a processing system which may be adapted to communicate with a "peripheral device." For example, a peripheral device may provide inputs to or receive outputs from an application process hosted on the host processing system. However, these are merely examples of a host processing system and peripheral device and embodiments of the present invention are not limited in these respects.

A "data bus" as referred to herein relates to circuitry for transmitting data between devices. For example, a data bus may transmit data between a host processing system and a peripheral device. However, this is merely an example of a data bus and embodiments of the present invention are not limited in this respect. A "bus transaction" as referred to herein relates to an interaction between devices coupled in a bus structure wherein one device transmits data addressed to the other device through the bus structure.

An "operating system" as referred to herein relates to one or more encoded procedures for facilitating communication between application procedures and processing resources of a processing system. Such an operating system may allocate processing resources to application procedures and provide an application programming interface (API) comprising callable software procedures for execution on the processing resources in support of application procedures. However, these are merely examples of an operating system and embodiments of the present invention are not limited in these respects. A "basic input/output system" (BIOS) refers to systems for providing machine-readable instructions ("BIOS routines") to a processing system processor for initializing hardware resources of a processing system.

A "system reset" as discussed herein relates to an event or procedure in which a processing system is returned to a predefined state. For example, a system reset procedure may involve halting execution of one or more processes on a processing system followed by executing a process to attempt loading an operating system. This may be preceded by an execution of instructions provided by a BIOS to retrieve instructions for the operating system from a non-volatile memory. However, this is merely an example of a system reset procedure and embodiments of the present invention are not limited in this respect.

A "firmware interface" refers to software routines and data structures to enable communication between an operating system and hardware resources of a processing system. Such a firmware interface may define an interface between the hardware resources of a processing system and for one or more or more independently developed operating systems. However, this is merely an example of a firmware interface and embodiments of the present invention are not limited in this respect. According to an embodiment, BIOS routines may be executed on hardware resources to install the software routines and data structures of a firmware interface on hardware resources of a processing system and then subsequently install an operating system during a boot sequence or in response to a system reset event. However, this is merely an example of a firmware interface and embodiments of the present invention are not limited in this respect.

A "boot procedure" as discussed herein relates to a procedure by which initial instructions are loaded to a memory of a processing system and then executed. For example, a boot procedure may involve loading an operating system to a memory of a processing system. This may be preceded by the execution of instructions provided by a BIOS associated with the processing system which instructs the processing system to retrieve instructions from a non-volatile memory device for providing an operating system. However, this is merely an example of a boot procedure and embodiments of the present invention are not limited in this respect.

A program "launch" as referred to herein relates to an initiation of an execution of the program on a processing system. This may occur, for example, upon an initiation of the execution of instructions for the program at a location in a system memory of the processing system. However, this is merely an example of a program launch and embodiments of the present invention are not limited in this respect.

A "boot manager" as referred to herein relates to logic or data in a firmware interface defining a sequence of events or actions to be taken in response to a system reset event on a processing system. A boot manager may define variables that point to files to be loaded in response to a system reset event. For example, a boot manager may enumerate one or more processes for loading an operating system to the processing system. Additionally, a boot manager may initialize essential drivers and determine available operating systems for the processing system. However, these are merely examples of a boot manager and embodiments of the present invention are not limited in these respects.

Briefly, an embodiment of the present invention is directed to a system and method of launching an operating system on a processing system. A firmware interface may be launched on a processing system. The firmware interface may comprise logic to attempt launching an operating system on the processing system. Upon detection that the attempt is unsuccessful, a system reset on the processing system may be automatically initiated. However, this is merely an example embodiment and other embodiments of the present invention are not limited in these respects.

FIG. 1 is a schematic diagram illustrating a processing platform architecture 20 according to an embodiment of the present invention. A central processing unit (CPU) 2 is coupled through a data bus 10 to a random access memory (RAM) 4, basic input/output system (BIOS) 6 and a non-volatile memory (NVM) 8 such as a hard disk drive or flash memory device. Devices on the bus 10 may also be coupled to one or more peripheral devices such as a network interface controller (NIC) 18, universal serial bus (USB) 16 and small computer system interface (SCSI) 22 through a bridge 14 and a bus 12. However, this is merely an example architecture of a processing platform and embodiments of the present invention are not limited in this respect. Also, the busses 10 and 12 may be any suitable communication bus such as a peripheral components interconnection (PCI) bus. However, this is merely an example of a data bus format and embodiments of the present invention are not limited in this respect.

A "system memory" of the presently illustrated embodiment may comprise portions of the RAM 4 and NVM 8 to provide memory resources for use during dynamic operation of the processing system. In the illustrated embodiment, the BIOS 6 may comprise a memory for storing BIOS routines to be executed on the CPU 2 during a boot sequence or in response to a system reset event. Execution of the BIOS routines may initiate the loading of a firmware interface from the BIOS 6 or NVM 8 to the RAM 4, followed by the loading of an operating system from the NVM 8 to the RAM to create an image in the system memory. Following the boot procedure, the firmware interface may provide pointers to locations in the system memory to direct the CPU 2 to execute instructions in the image for performing tasks. However, embodiments of the present invention are not limited in this respect and a firmware interface and operating system may be loaded to a system memory using other techniques.

Such an operating system loaded to the RAM 4 during a boot procedure may comprise, for example, any one of several operating systems for desktop or mobile computers such as, for example, versions of Windows™ sold by Microsoft Corporation, or any one of several operating systems for real-time or embedded applications such as, for example, versions of Linux or versions of VxWorks or pSOS sold by Windriver Systems, Inc. However, these are merely examples of operating systems for desktop or mobile computer systems and for real-time or embedded applications, and embodiments of the present invention are limited in this respect as other operating systems may be used.

Figure 2:
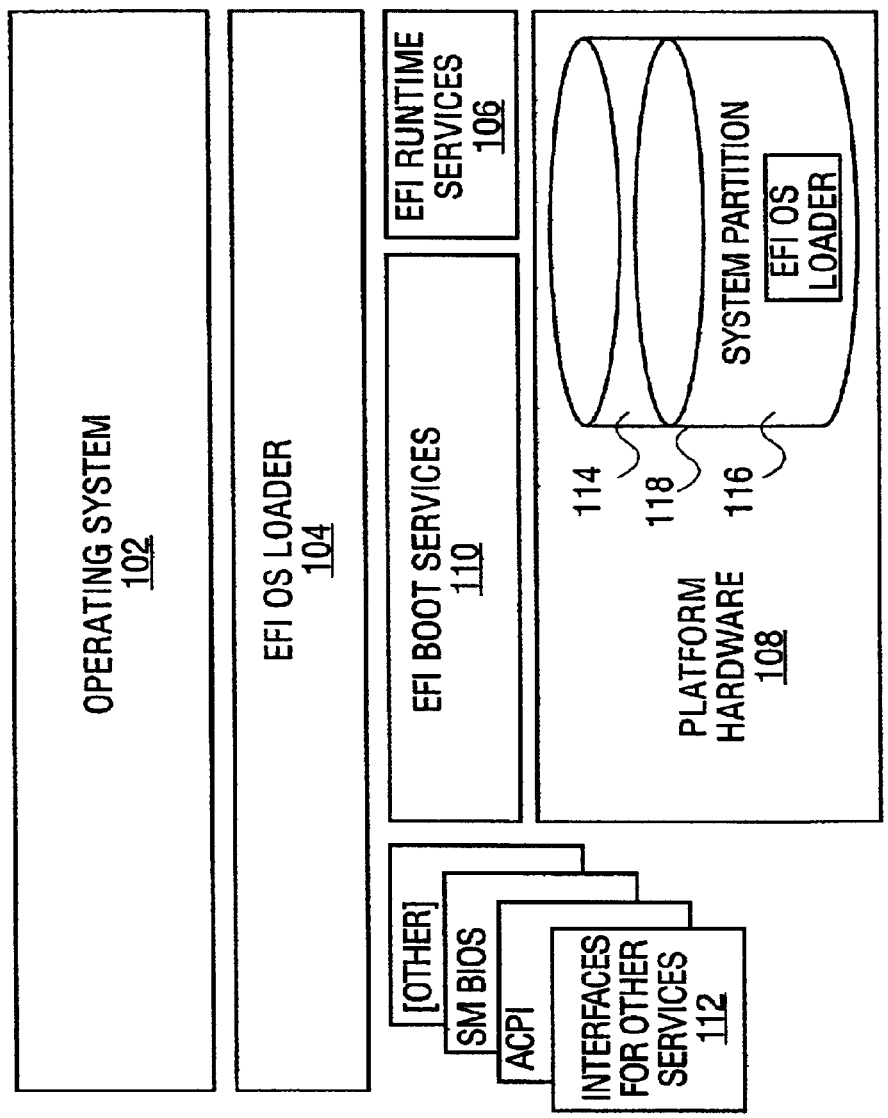
FIG. 2 is a schematic diagram illustrating a software configuration comprising a firmware interface according to an embodiment of the present invention.

FIG. 2 is a schematic diagram illustrating a software configuration comprising a firmware interface according to an embodiment of the present invention. In the illustrated embodiment, a system reset event or boot procedure may install a firmware interface such as an extensible firmware interface (EFI) as described in the Extensible Firmware Interface Specification, Version 0.99, Apr. 19, 2000 published by Intel Corporation (hereinafter "EFI Specification"). However, embodiments of the present invention are not limited in this respect and other firmware interfaces may be used.

In the illustrated embodiment, an operating system may communicate with platform hardware 108 through an EFI or interfaces 112 for other services such as, for example, an Advanced Configuration and Power Interface (ACPI), ACPI Specification, Revision 1.0, Dec. 22, 1996, Intel Corp., Microsoft Corp. and Toshiba Corp., and System Management BIOS (SMBIOS), SMBIOS Reference Specification Version 2.3.1, Mar. 16, 1999. However, embodiments of the present invention are not limited in this respect and the operating system may communicate with system hardware using other techniques.

The platform hardware 108 comprises a system memory 118 which is capable of storing executable images of the operating system 102 and the EFI. In the illustrated embodiment, the EFI runtime services 106, EFI boot services 110 and EFI operating system (OS) loader 104 may reside in a first area 116 of the system memory 118 and the operating system 102 may reside in a second area 114 of the system memory 118. While FIG. 2 shows that first and second areas 116 and 114 of the system memory 118 are contiguous, it should be understood by those of ordinary skill in the art that such areas of memory need not be physically contiguous in the system memory 118. It should be understood that locations internal to the area 116 need not be contiguous in the system memory 118.

According to an embodiment, BIOS routines may load the EFI runtime services 106 and EFI boot services 110 to the system memory 118 separately from a process for loading of the operating system 102. The EFI runtime services 106 and EFI boot services 110 may be launched to the platform hardware 108 in response to a system reset. Upon launching the EFI boot services 110, a boot manager may launch an EFI OS loader 104.

In the illustrated embodiment, an "EFI System Table" may be maintained in conjunction with the firmware interface to provide a reference to EFI boot services 110. The EFI System table may maintain a list of globally unique identifiers (GUIDs) referenced to function pointers. Accordingly, the EFI OS loader 104 may retrieve function pointers to the EFI boot services 110 using the GUIDs. However, embodiments of the present invention are not limited in this respect and pointers to runtime functions may be located using other techniques.

Figure 3:
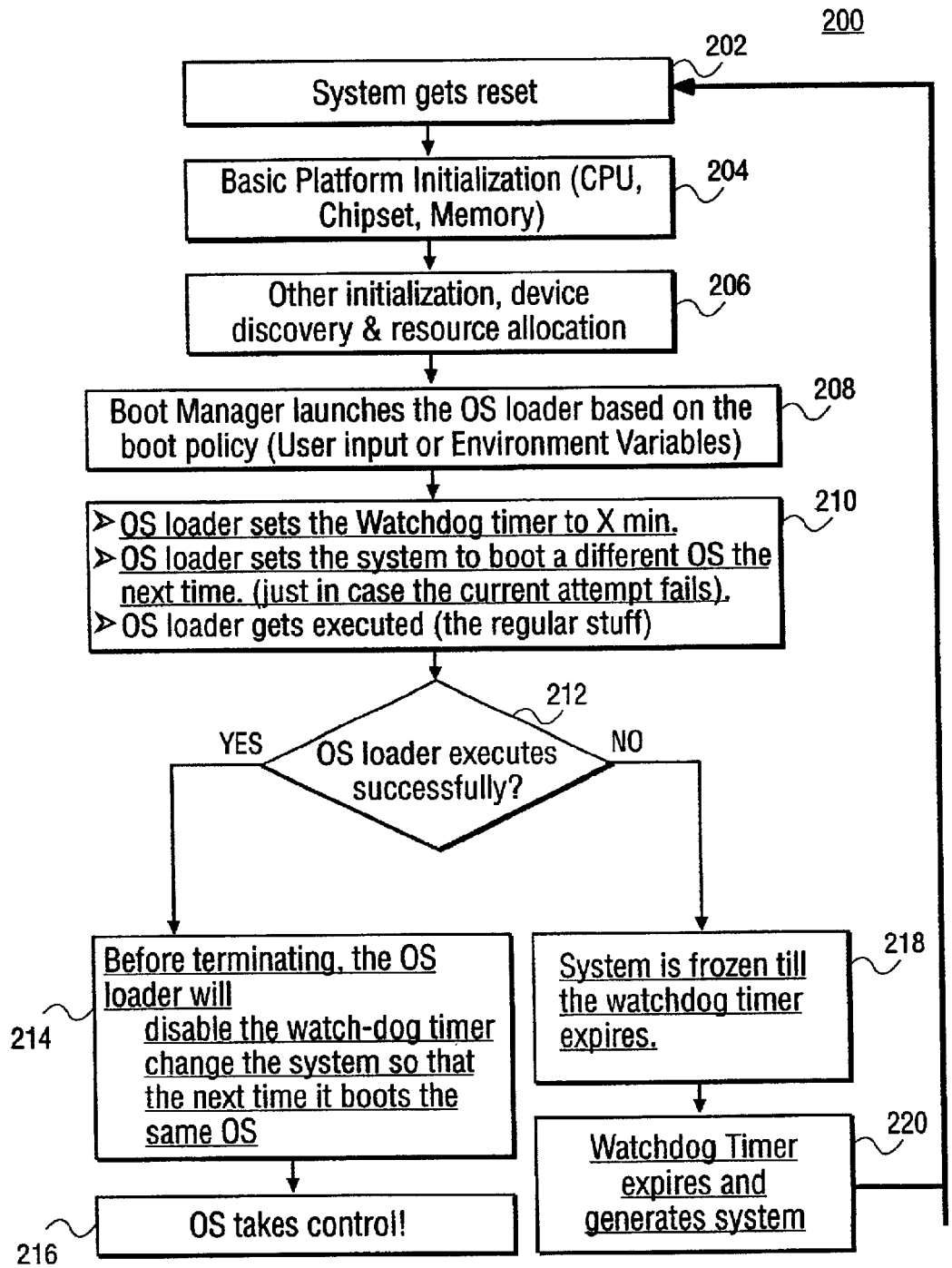
FIG. 3 is flow diagram illustrating a process of loading an operating system to a processing system according to an embodiment of the present invention.

FIG. 3 shows a flow diagram illustrating a process 200 for attempting to load an operating system to a processing system according to an embodiment of the present invention illustrated with reference to FIG. 2. At block 202, a system reset is initiated at the processing system. The system reset may be initiated by a BIOS routine in response to a boot procedure or processing system event. However this is merely an example of how a system reset may be initiated in a processing system and embodiments of the present invention are not limited in this respect. In response to the reset event, hardware in the processing system may be initialized at block 204 by, for example, one or more BIOS routines. Then, initialization of peripheral devices and allocation of resources to support the peripheral devices (e.g., bus enumeration) may be performed by BIOS routines at block 206. However, this is merely an example of how a processing system may be initialized in response to a reset event and embodiments of the present invention are not limited in this respect.

In addition to initializing peripheral devices and allocating resources to same at block 206, BIOS routines may launch a firmware interface such as an EFI as described in the EFI specification. For example, block 206 may comprise launching a boot manager as part of the EFI. In an embodiment of a processing system as illustrated with reference to FIG. 2, such an EFI may comprise EFI boot services. The firmware interface may comprise a boot manager which facilitates launch of an OS loader at block 208. In the illustrated embodiment, the OS loader may comprise logic to launch one or more operating systems to the processing system. However, this is merely an example of how an OS loader may be initialized and embodiments of the present invention are not limited in this respect.

In the illustrated embodiment, a boot manager may launch any one of multiple OS loaders where each OS loader comprises logic to launch an associated one of multiple operating systems. The boot manager may determine which of the operating systems are capable of being hosted on the processing system base on, for example, the hardware configuration of the processing system as indicated by BIOS routines. The OS loader of a capable operating system may then be selected to launch the operating system. However, this is merely an example of how a boot manager may support the launching of an operating system selected from multiple operating systems and embodiments of the present invention are not limited in this respect.

At block 210, the OS loader may set a watchdog timer to a prespecified time interval, attempt to launch an operating system, and wait at diamond 212 for either a detection of a successful launch of the operating system at block 214 or an unsuccessful attempt at block 218. According to an embodiment, each OS loader for each operating system may specify a different time interval for the watchdog based on one or more factors such as, for example, particular characteristics of the operating and an expected time to launch, platform hardware characteristics and any particular operating requirements associated with the processing platform (e.g., embedded system requirements or desktop system requirements). Logic for determining the time interval may be provided in a BIOS routine. However, these are merely examples of how a time interval for a watchdog timer may be determined and embodiments of the present invention are not limited in these respects.

Block 218 detects an unsuccessful attempt to launch when the watchdog timer expires before the operating system has been launched (i.e., the processing system is considered to be "frozen"). Upon detection of such an unsuccessful attempt, block 220 initiates a system reset at block 202. Otherwise, if the operating successfully launches before the watchdog timer expires, block 214 may disable the watchdog timer and terminate the OS loader before the operating system takes control of the processing platform at block 216. In the illustrated embodiment, block 214 may detect a successful launch of an operating system by, for example, detecting the completion of one more tasks initiated by the OS loader and the absence of one or more error conditions. However, this is merely an example of detecting a successful launch of an operating system and embodiments of the present invention are not limited in this respect.

According to an embodiment, the boot manager may comprise logic to attempt loading different operating systems on subsequent reset cycles. Therefore, if an attempt to launch a first operating system on a first reset cycle may be followed an attempt to launch a second, different operating system on a second reset cycle if the first attempt is unsuccessful. Accordingly, the OS loader at block 210 may set the processing system to attempt launching a second operating system in a subsequent reset cycle if an attempt to launch a first operating system in the current reset cycle fails. Upon successful launch of the operating system, the OS loader at block 214 may then set the boot manager to attempt launching the first operating system in a subsequent system reset cycle or system boot. However, this is merely an example of how a firmware interface may enable attempts to launch an alternative operating system if an attempt to launch an initial operating system fails.

Figure 4B:
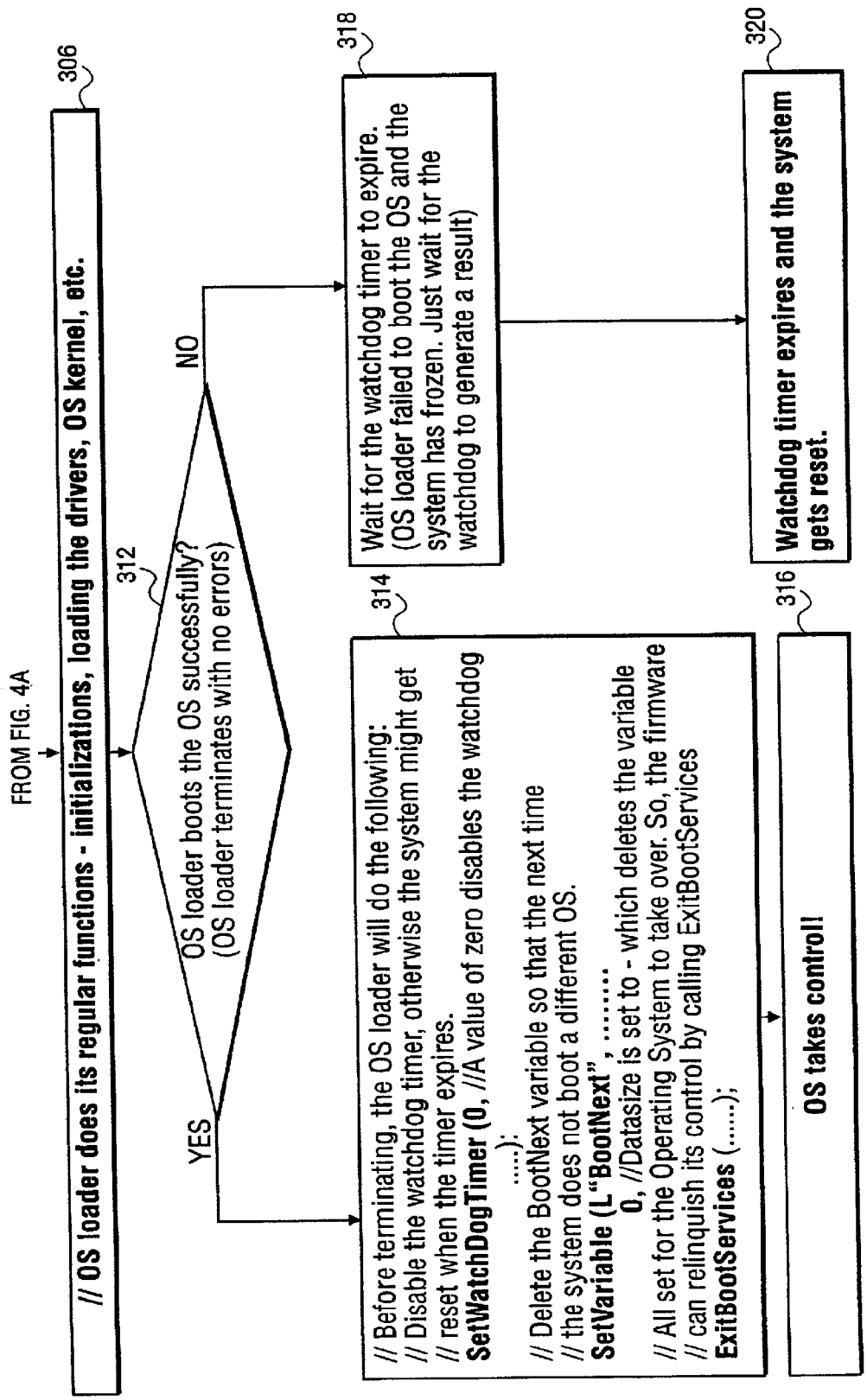

FIGS. 4A–B show a flow diagram illustrating a process 300 according to an embodiment of the process illustrated in FIG. 3 in which the boot manager and OS loader are provided in a firmware interface according to the EFI specification. At block 302, the OS loader may set a watchdog timer as illustrated in the EFI specification at Section 3.8.2. In one embodiment, a particular OS loader for an operating system may determine the prespecified time delay for waiting for a successful OS launch depending on the particular operating system for the current launch attempt, the processing platform configuration or a particular purpose of the processing platform. However, this is merely an example of setting a watchdog timer to detect an unsuccessful attempt to launch an operating system and embodiments of the present invention are not limited in this respect.

The boot manager may define "BootOrder" as an array of operating system identifiers associated with operating systems (i.e., operating systems for which launches may be attempted), "BootCurrent" as an index to an identifier for the currently selected operating system identified in the BootOrder array (i.e., the operating system for which a launch may be attempted in the current system reset cycle) and "BootNext" as an index to identifier in the BootOrder array for the next operating system to be selected for a subsequent reset cycle if the operating system identified by BootCurrent fails to launch in the current reset cycle. The OS loader may then define which operating system is to be launched in a subsequent reset cycle by setting BootNext as the index in the BootOrder array to the currently selected operating system incremented by one.

At diamond 312, the OS loader may detect a successful launch of the operating system defined by, for example, completing one or more tasks initiated by the OS loader in the absence of one or more particular errors. Upon detection of a successful operating system launch, block 314 may disable the watchdog timer by through SetWatchDogTimer and delete BootNext to ensure that the successfully loaded operating system is loaded in response to a subsequent reset event.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A method comprising:

launching a firmware interface on a processing system;

executing logic in the firmware interface to attempt launching a first operating system on the processing system from among a plurality of operating systems;

setting a timer to expire at a first interval following the attempt to launch the first operating system, the first interval being based, at least in part, on the first operating system;

detecting an unsuccessful attempt to launch the first operating system at the firmware interface based upon an expiration of the timer;

initiating a system reset of the processing system by the firmware interface in response to detecting the unsuccessful attempt to launch the first operating system;

executing logic in the firmware interface to attempt to launch a second operating system on the processing system from among the plurality of operating system in response to the system reset; and setting the timer to expire at a second interval following the attempt to launch the second operating system, the second interval being based, at least in part, on the second operating system.

2. The method of claim 1, the method further comprising:

detecting a successful launch of the second operating system at the firmware interface; and disabling the timer in response to detecting the successful launch of the second operating system.

3. The method of claim 1, the method further comprising launching the firmware interface in response to an execution of one or more BIOS routines.

4. The method of claim 3, the method further comprising:

launching a boot manager in response to the execution of the one or more BIOS routines; and launching an operating system loader from the boot manager.

5. The method of claim 1, wherein the method further comprises:

determining that the first operating system is capable of being launched on the processing system prior to executing logic to attempt to launch the first operating system; and determining that the second operating system is capable of being launched on the processing system prior to executing logic to attempt to launch the second operating system.

6. The method of claim 1, wherein the first and second operating systems comprise different versions of an operating system provided by a single vendor.

7. The method of claim 1, wherein the first operating system is provided by a first vendor and the second operating system is provided by a second vendor different from the first vendor.

8. A processing system comprising:

logic to attempt to launch a first operating system from among a plurality of operating systems;

logic to set a timer to expire at a first interval following the attempt to launch the first operating system, the first interval being based, at least in part, on the first operating system;

logic to detect an unsuccessful launch of a first operating system in response to an expiration of the timer;

logic to initiate a system reset of the processing system in response to detecting the unsuccessful attempt to launch the first operating system;

logic to attempt a launch of a second operating system from among the plurality of operating systems in response to the system reset; and logic to set the timer to expire at a second interval following the attempt to launch the second operating system, the second interval being based, at least in part, on the second operating system.

9. The processing system of claim 8, the processing system further comprising:

logic to detect a successful launch of the second operating system; and logic to disable the timer in response to detecting the successful launch of the second operating system.

10. The processing system of claim 8, the processing system further comprising logic to launch a firmware interface in response to an execution of one or more BIOS routines.

11. The processing system of claim 10, the processing system further comprising:
   logic to launch a boot manager in response to the execution of the one or more BIOS routines; and
   logic to launch an operating system loader from the boot manager.

12. The processing system of claim 8, wherein the processing system further comprises:
   logic to determine that the first operating system is capable of being launched on the processing system prior to attempting to launch the first operating system; and
   logic to determine that the second operating system is capable of being launched on the processing system prior to attempting to launch the second operating system.

13. The processing system of claim 8, wherein the first and second operating systems comprise different versions of an operating system provided by a single vendor.

14. The processing system of claim 8, wherein the first operating system is provided by a first vendor and the second operating system is provided by a second vendor different from the first vendor.

15. An article comprising:
   a storage medium comprising machine-readable instructions stored thereon for:
   attempting to launch a first operating system from among a plurality of operating systems on a processing system;
   setting a timer to expire at a first interval following the attempt to launch the first operating system, the first interval being based, at least in part, on the first operating system;
   detecting an unsuccessful attempt to launch the first operating system based upon an expiration of the timer;
   initiating a system reset of the processing system in response to detecting the unsuccessful attempt to launch the first operating system;
   attempting to launch a second operating system on the processing system from among the plurality of operating system in response to the system reset; and
   setting the timer to expire at a second interval following the attempt to launch the second operating system, the second interval being based, at least in part, on the second operating system.

16. The article of claim 15, wherein the storage medium further comprises machine-readable instructions stored thereon for:
   detecting a successful launch of the second operating system; and
   disabling the timer upon detecting the successful launch of the second operating system.

17. The article of claim 15, wherein the storage medium further comprises machine-readable instructions stored thereon for launching a firmware interface in response to an execution of one or more BIOS routines.

18. The article of claim 17, wherein the storage medium further comprises machine-readable instructions stored thereon for:
   launching boot manager in response to the execution of the one or more BIOS routines; and
   launching an operating system loader from the boot manager.

19. The article of claim 15, wherein the storage medium further comprises machine-readable instructions stored thereon for:
   determining that the first operating system is capable of being launched on the processing system prior to attempting to launch the first operating system; and
   determining that the second operating system is capable of being launched on the processing system prior to attempting to launch the second operating system.

20. The article of claim 15, wherein the first and second operating systems comprise different versions of an operating system provided by a single vendor.

21. The article of claim 15, wherein the first operating system is provided by a first vendor and the second operating system is provided by a second vendor different from the first vendor.

22. A system comprising:
   a data bus;
   one or more peripheral devices; and
   a host processing system coupled to the one or more peripheral devices through the data bus, the host processing system comprising:
   logic to attempt to launch a first operating system from among a plurality of operating systems;
   logic to set a timer to expire at a first interval following the attempt to launch the first operating system, the first interval being based, at least in part, on the first operating system;
   logic to detect an unsuccessful launch of a first operating system in response to expiration of the timer;
   logic to initiate a system reset of the processing system in response to detecting the unsuccessful attempt to launch the first operating system;
   logic to attempt a launch of a second operating system from among the plurality of operating systems in response to the system reset; and
   logic to set the timer to expire at a second interval following the attempt to launch the second operating system, the second interval being based, at least in part, on the second operating system.

23. The system of claim 22, wherein the host processing system further comprises:
   logic to detect a successful launch of the second operating system; and
   logic to disable the timer in response to detecting the successful launch of the second operating system.

24. The system of claim 22, wherein the host processing system further comprises:
   logic to determine that the first operating system is capable of being launched on the processing system prior to attempting to launch the first operating system; and
   logic to determine that the second operating system is capable of being launched on the processing system prior to attempting to launch the second operating system.

25. The system of claim 22, wherein the first and second operating systems comprise different versions of an operating system provided by a single vendor.

26. The system of claim 22, wherein the first operating system is provided by a first vendor and the second operating system is provided by a second vendor different from the first vendor.

27. An apparatus comprising:

means for attempting to launch a first operating system from among a plurality of operating systems on a processing system;

means for setting a timer to expire at a first interval following the attempt to launch the first operating system, the first interval being based, at least in part, on the first operating system;

means for detecting an unsuccessful attempt to launch the first operating system based upon an expiration of the timer;

means for initiating a system reset of the processing system in response to detecting the unsuccessful attempt to launch the first operating system;

means for attempting to launch a second operating system on the processing system from among the plurality of operating system in response to the system reset; and means for setting the timer to expire at a second interval following the attempt to launch the second operating system, the second interval being based, at least in part, on the second operating system.

28. The apparatus of claim 27, the apparatus further comprising:

means for detecting a successful launch of the second operating system; and means for disabling timer in response to detecting the successful launch of the second operating system.

29. The apparatus of claim 27, wherein the apparatus further comprises:

means for determining that the first operating system is capable of being launched on the processing system prior to attempting to launch the first operating system; and means for determining that the second operating system is capable of being launched on the processing system prior to attempting to launch the second operating system.

30. The apparatus of claim 27, wherein the first and second operating systems comprise different versions of an operating system provided by a single vendor.

31. The apparatus of claim 27, wherein the first operating system is provided by a first vendor and the second operating system is provided by a second vendor different from the first vendor.

* * * * *